United States Patent
Fleck et al.

(10) Patent No.: US 8,273,503 B2
(45) Date of Patent: Sep. 25, 2012

(54) HIGH-TEMPERATURE FUEL CELL SYSTEM AND METHOD FOR THE PRODUCTION OF CONTACTING ELEMENTS FOR SUCH A FUEL CELL SYSTEM

(75) Inventors: Robert Fleck, Adelsdorf (DE); Harald Landes, Rückersdorf (DE)

(73) Assignee: Siemens Energy, Inc., Orlando, FL (US)

( * ) Notice: Subject to any disclaimer, the term of this patent is extended or adjusted under 35 U.S.C. 154(b) by 597 days.

(21) Appl. No.: 11/664,064

(22) PCT Filed: Sep. 28, 2005

(86) PCT No.: PCT/EP2005/054886
§ 371 (c)(1),
(2), (4) Date: Oct. 6, 2008

(87) PCT Pub. No.: WO2006/035046
PCT Pub. Date: Apr. 6, 2006

(65) Prior Publication Data
US 2009/0061260 A1    Mar. 5, 2009

(30) Foreign Application Priority Data
Sep. 30, 2004  (DE) .......... 10 2004 047 761

(51) Int. Cl.
*H01M 4/64* (2006.01)
*H01M 2/20* (2006.01)
*H01M 8/10* (2006.01)

(52) U.S. Cl. ........ 429/519; 429/522; 429/517; 429/468; 429/479

(58) Field of Classification Search .................. 429/468, 429/479, 517–522
See application file for complete search history.

(56) References Cited

U.S. PATENT DOCUMENTS

| | | | |
|---|---|---|---|
| 4,874,678 A | 10/1989 | Reichner | |
| 6,379,831 B1 | 4/2002 | Draper et al. | |
| 6,416,897 B1 * | 7/2002 | Tomlins et al. | 429/466 |
| 7,892,698 B2 * | 2/2011 | Zhang et al. | 429/517 |
| 2006/0285993 A1 * | 12/2006 | Rakowski | 420/70 |

FOREIGN PATENT DOCUMENTS

| | | |
|---|---|---|
| EP | 0 320 087 | 6/1989 |
| EP | 0 536 909 | 4/1993 |
| EP | 1 271 684 A2 | 1/2003 |

(Continued)

OTHER PUBLICATIONS

International Search Report (PCT/ISA/210).

(Continued)

*Primary Examiner* — Karie O'Neill Apicella
(74) *Attorney, Agent, or Firm* — Harness, Dickey & Pierce, P.L.C.

(57) ABSTRACT

A high-temperature fuel cell system includes individual SOFC fuel cells which are in contact with each other for electrically connecting the same in parallel or in series. In at least one embodiment, contacting elements that are suitable for the fuel cell system with a certain flexibility in addition to the required electrical conductivity for continuous operation. The contacting elements between two fuel cells are formed by a metal wire mesh that is advantageously made of nickel. Such nickel wires can be mechanically transformed into a continuous mesh, especially a tube, from which sections having a suitable length can be cut and be provided with the proper shape.

16 Claims, 2 Drawing Sheets

FOREIGN PATENT DOCUMENTS

| | | |
|---|---|---|
| EP | 1271684 | 1/2003 |
| EP | 1 284 510 A2 | 2/2003 |
| EP | 1284510 | 2/2003 |
| WO | 2004/070858 | 8/2004 |
| WO | WO 2004/070858 A2 | 8/2004 |
| WO | WO 2004070858 A2 * | 8/2004 |

OTHER PUBLICATIONS

PCT/ISA/220.

* cited by examiner

HIGH-TEMPERATURE FUEL CELL SYSTEM AND METHOD FOR THE PRODUCTION OF CONTACTING ELEMENTS FOR SUCH A FUEL CELL SYSTEM

PRIORITY STATEMENT

This application is the national phase under 35 U.S.C. §371 of PCT International Application No. PCT/EP2005/054886 which has an International filing date of Sep. 28, 2005, which designated the United States of America and which claims priority on German Patent Application number 10 2004 047 761.2 filed Sep. 30, 2004, the entire contents of which are hereby incorporated herein by reference.

FIELD

Embodiments of the invention generally relate to a high-temperature fuel-cell system or installation, such as, for example, one including a plurality of individual fuel cells which make contact with one another in order to be connected electrically in parallel and/or in series, flexible and electrically conductive contact-making elements being used for this purpose. Embodiments of the invention also generally relate to a method for production of contact-making elements for a fuel-cell system or installation.

BACKGROUND

Fuel-cell installations or systems composed of high-temperature fuel cells are known, for example, from WO 2004/070858 A, U.S. Pat. No. 6,379,831 B1, and EP 1 271 684 A. In this case, the individual fuel cells are in the form of flat cells or tubes. Contact-making elements are provided between the cells and, in particular, are in the form of a mesh over an area. Vertical structures are also provided in WO 2004/070858 A. These structures are intended to be produced by folding of the mesh in predetermined directions in places, although this results in loss of flexibility. This adversely affects the long-term behavior of the contacts.

In the above prior art, contact strips can be used in order to make electrical contact with solid-ceramic fuel cells, connected in series or in parallel. Particularly in the case of tubular fuel cells, these contact strips are applied along a tubular fuel cell to the interconnector that is already provided there, and connect the cathode and anode of two individual fuel cells which are arranged one above the other (connected electrically in series). A plurality of adjacent fuel cells can be connected via one contact strip, in order to connect them in parallel (electrical connection in parallel).

Known contact-making elements which have been used in the past for electrical connection of tubular high temperature fuel cells are composed of nickel felt strips, which include a multiplicity of fine nickel fibers with a thickness of only a few tens of micrometers, and are therefore both flexible and compressible. In the compressed state, the nickel felt strips have a width of about 6 mm, and a height of 3 to 4 mm.

The height of the contact strip during its installation is governed by the distance which must be bridged by the contact between two cells. This is described in detail, for example, in EP 0 320 087 B1 and in EP 0 536 909 A1. For correct use, the nickel felts are adhesively bonded to the interconnector on the one hand and to the anode on the other hand, by means of a nickel paste. The paste is sintered at the operating temperature of the high-temperature fuel cells.

The production of the latter nickel felts is time-consuming, and associated with a large number of manufacturing steps. This incurs high costs. Furthermore, one undesirable characteristic of these contact strips is that the nickel felts can be resintered during long-term operation, so that the cell contact becomes rigid as a result of loss of flexibility and elasticity. This can result in individual contacts being torn off, and thus in the fuel-cell installation losing power, in the event of major temperature fluctuations.

SUMMARY

At least one embodiment of the invention provides a fuel-cell system including a multiplicity of individual fuel cells, in which the contact for electrical connection of the individual cells in parallel or in series is improved. At least one embodiment of the invention further specifies production methods for contact-making elements such as these.

At least one embodiment of the invention is directed to a contact-making element such as this, in which the electrical contact is formed from a metallic knitted fabric in such a way that this results in elasticity in all spatial directions, as well as flexibility. The basic material for the novel contact-making elements is accordingly nickel on the basis of the initially cited prior art. However, alloys based on nickel are also possible.

The knitted fabric according to at least one embodiment of the invention is preferably composed of nickel-based wires with a thickness of 50 to 150 μm, in particular about 100 μm. The knitted fabric advantageously has a porosity of >80%.

The contact-making elements according to at least one embodiment of the invention can be produced industrially as an endless part, using a knitting process. Nickel wires with a thickness of about 100 μm can be processed well, with the knitted fabric produced in this way having the required electrical conductivity characteristics. Contact-making elements of the required shape and with good elasticity and compressibility can be produced from knitted-fabric parts that have been cut to length, by pressing and folding.

BRIEF DESCRIPTION OF THE DRAWINGS

Further details and advantages of the invention will become evident from the following description of the figures of example embodiments in conjunction with the patent claims. In the figures:

DETAILED DESCRIPTION OF THE EXAMPLE EMBODIMENTS

Figure 1:
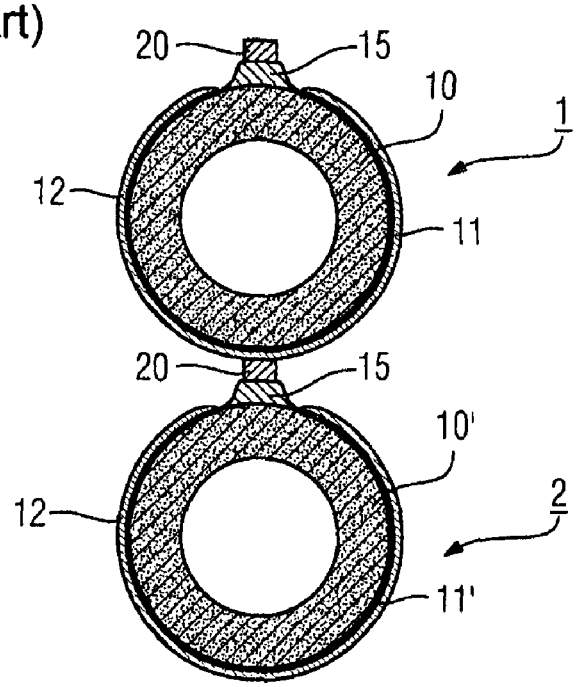
FIG. 1 shows a detail of a fuel-cell system with the cell contact between two individual fuel cells, according to the prior art.

FIG. 1 shows an arrangement with two tubular fuel cells 1, 2, corresponding to the prior art. 10 and 10' denote sintered cathode tubes, on which individual functional layers are located in order to form the fuel cell. Functional layers such as these are at least an electrolyte 11 on the one hand and an anode 12 on the other hand. Intermediate layers can also be provided, but are not illustrated in detail in FIG. 1.

Since a large number of individual cells must be electrically connected to one another in order to achieve sufficient voltages and currents, the individual cells are, for example, connected in series with one another. For this purpose, the cathode of a first cell must in each case make contact with the anode of a second cell. For this purpose, a so-called interconnector 15 is located on the cathode tubes 10 and 10', in a narrow area which is not covered by the electrolyte 11 or by the anode 12. A separate contact element 20 is fitted to the interconnector 15, in order to make contact between the cell 1 and the next cell 2.

Conventional tubular fuel cells have an external diameter of, for example, 22 mm, with the cathode tube having a thickness of 2 mm. The cathode tubes are about 1800 mm long, and are closed at one end. The interconnector 15 is located on the cathode tube 10, as a narrow strip with a thickness of about 40 to 100 μm. The electrolyte 11 and the anode 12 likewise have a thickness in the region of about 100 μm.

For correct connection of two fuel cells 1 and 2, the contact 20 must have a thickness of about 3 mm. Since the fuel-cell arrangement operates at temperatures in the region of 1000° C., the materials must be matched to one another, particularly in terms of their coefficients of expansion, in order to ensure adequate robustness. The normally used nickel contacts must therefore be elastic and flexible up to a certain extent. This is made possible by the structure of the knitted fabric, in a particularly simple manner.

Figure 2:
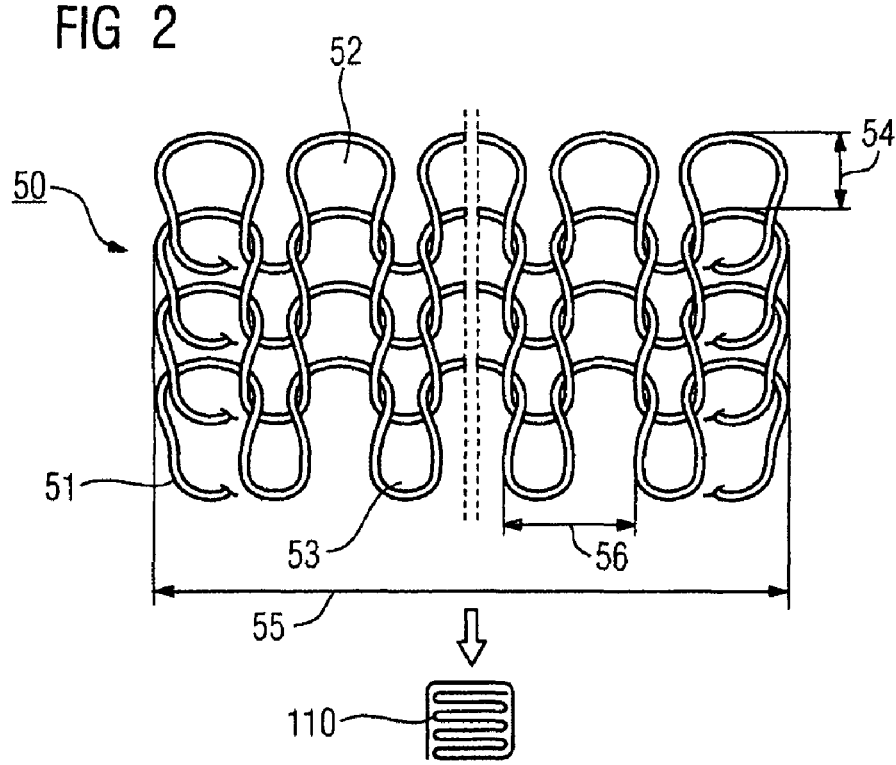
FIG. 2 shows the production of a contact-making element composed of a nickel knitted fabric and FIG. 3 shows contact-making elements which have been produced in this way, for connection of HPD fuel-cell elements.

As can be seen from FIG. 2, wire mesh fabrics can be manufactured in an automated form from a metallic wire: in this case, 50 denotes the wire mesh composed of individual wires 51, for example as a flat mesh or else a round flexible tube. The parameters which are governed by the tool ("needle loop" 52, "web loop" 53) on the one hand and the mesh width ("mesh lop" 54, "mesh length or division" 56) on the other hand are predetermined, thus resulting in the wire mesh 50 having a predeterminable width 55.

For use as contact-making elements for high-temperature fuel cells, the wires are formed from nickel, which has the required electron conductivity even at the working temperature of the SOFC. The nickel wires have a diameter of about 100 μm. Wires with this diameter can be processed well, and are sufficiently flexible. In practice, a value of 150 μm has been found to be the upper limit for the wire diameter.

Wires such as these may also be composed of a nickel alloy, in particular a two-component alloy with nickel as the basic metal and with a suitable metallic secondary component. Alternatively, multiple-component alloys with a plurality of secondary components are also possible.

In particular, the metals copper (Cu) chromium (Cr), cobalt (Co), titanium (Ti) or else their oxides may be used as secondary components for the nickel-based alloys. The total proportion of secondary components should not exceed 30% by weight.

The wire mesh 50 shown in FIG. 2 is manufactured continuously, for example as a flexible tube, as is known from meshing technology. In particular, a flexible tube may have different diameters. The wire mesh 50 itself has a porosity of >80% for correct use as elastic contact-making elements for SOFC fuel cells.

Individual parts of suitable length can be separated from the illustrated wire mesh 50 by cutting them off. In order to form a contact-making element 110, the elements that have been cut to length are pressed and folded to form a shape as is required for the respective purpose in the SOFC fuel cell.

Figure 3:
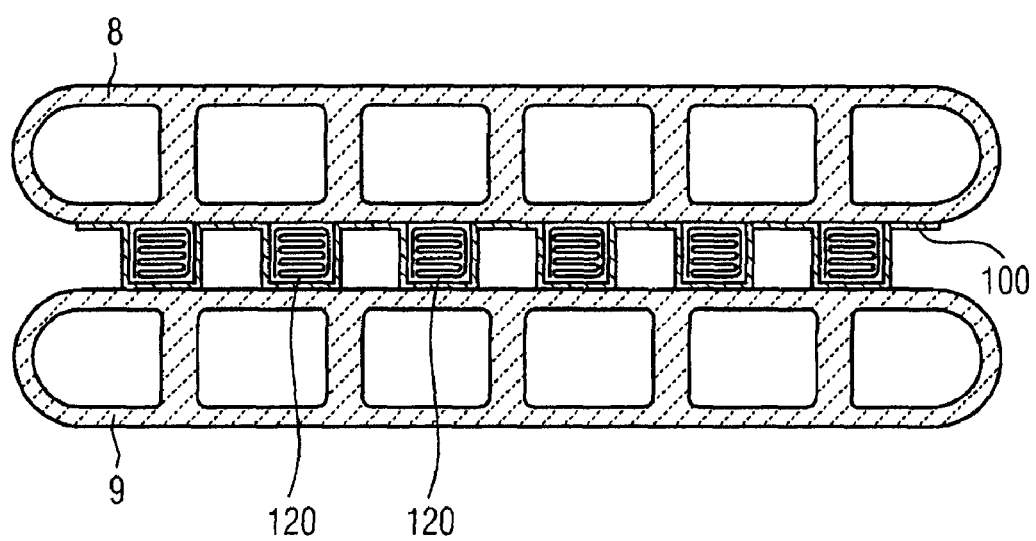

FIG. 3 shows two so-called HPD fuel cells 8 and 9. HPD fuel cells such as these comprise a flat sintered body, which may have a planar or corrugated surface, in which, for example, six or eight individual inner tubes are incorporated. The increased current density per cell volume in this case results in a particularly high output power (High Power Density) in comparison to individual tubes.

Contact-making elements 110, 120, . . . are located between the two HPD fuel cells 8 and 9 and are cut to length in sections from the wire mesh 50 shown in FIG. 2, for example a flexible tube, and are folded and pressed to form the shaped body 100. In addition, a continuous metal mesh 100 can be provided.

The latter arrangement allows two HPD fuel cells 8 and 9 to be connected to one another in an electrically reliable and mechanically robust manner. No faults occur even during long-term operation at high temperatures.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A high-temperature fuel-cell system, comprising:
a plurality of individual fuel cells;
electrically conductive and flexible contact-making elements electrically connecting the fuel cells in at least one of parallel and in series; and
a continuous metal mesh partially surrounding and contacting each of the contact-making elements,
wherein at least one of the contact-making elements is formed from a mesh including metallically conductive material, the mesh being in the form of a circumferential, three-dimensional flexible tube, and being uniformly flexible and elastic,
the at least one contact-making element is elastic in all spatial directions during operation of the high-temperature fuel-cell system.

2. The high-temperature fuel-cell system as claimed in claim 1, wherein the at least one contact-making element formed from the mesh conducts electrons, is thermally stable and is sufficiently gas-permeable.

3. The high-temperature fuel-cell system as claimed in claim 1, wherein the mesh is composed of a nickel alloy.

4. The high-temperature fuel-cell system as claimed in claim 3, wherein the nickel alloy is a multiple-component alloy, and wherein at least one other alloy component is a metal.

5. The high-temperature fuel-cell system as claimed in claim 4, wherein the other alloy component is at least one element selected from the group consisting of copper (Cu), chromium (Cr), cobalt (Co), and titanium (Ti).

6. The high-temperature fuel-cell system as claimed in claim 4, wherein further components of the nickel alloy have a proportion by weight of $\leq 30\%$.

7. The high-temperature fuel-cell system as claimed in claim 2, wherein the mesh has a porosity of >80%, with a wire thickness of between 50 and 150 μm.

8. A method for production of a contact-making element for a high-temperature fuel-cell system, comprising:
forming the contact-making element, for connecting a plurality of fuel cells of the fuel-cell system, from a mesh of metallic wires, the contact-making element being elastic in all spatial directions during operation of the high-temperature fuel-cell system,
wherein a continuous flexible tube of the mesh is first produced, and then the continuous flexible tube of mesh is cut into individual parts to length, and
each of the individual parts is folded and pressed to include a corrugated portion.

9. The method as claimed in claim 8, wherein the individual parts are folded and pressed such that the contact-making element has a desired shape.

10. The high-temperature fuel-cell system as claimed in claim 3,
wherein the nickel alloy includes at least one element selected from the group consisting of copper (Cu), chromium (Cr), cobalt (Co) and titanium (Ti).

11. The high-temperature fuel-cell system as claimed in claim 5, wherein further components of the nickel alloy have a proportion by weight of ≦30%.

12. The high-temperature fuel-cell system as claimed in claim 2, wherein the mesh has a porosity of >80%, with a wire thickness of about 100 μm.

13. The high-temperature fuel-cell system as claimed in claim 3, wherein the mesh has a porosity of >80%, with a wire thickness of between 50 and 150 μm.

14. The high-temperature fuel-cell system as claimed in claim 3, wherein further components of the nickel alloy have a proportion by weight of ≦30%.

15. The method of claim 8, wherein the mesh is composed of a nickel alloy, and
the nickel alloy is a multiple-component alloy, wherein at least one other alloy component is a metal.

16. The high-temperature fuel-cell system as claimed in claim 1, wherein a portion of the at least one contact-making element has a corrugated shape.

* * * * *